J. L. TAYLOR.
CLAMP MACHINE.
APPLICATION FILED APR. 7, 1916.

1,320,808.

Patented Nov. 4, 1919.
6 SHEETS—SHEET 1.

WITNESS
Howard P. King.

INVENTOR:
James L. Taylor,
BY
Russell M. Everett,
ATTORNEY.

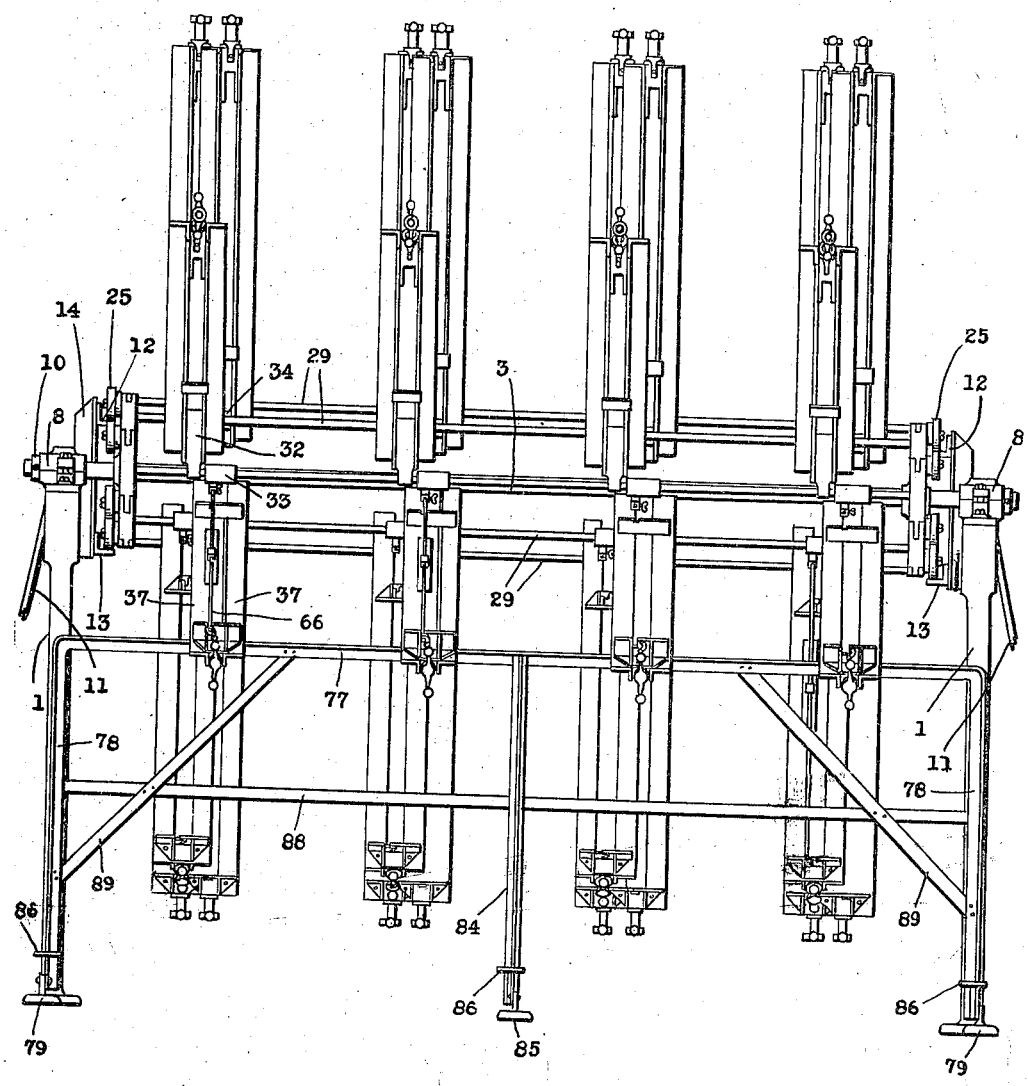

J. L. TAYLOR.
CLAMP MACHINE.
APPLICATION FILED APR. 7, 1916.

1,320,808.

Patented Nov. 4, 1919.
6 SHEETS—SHEET 3.

WITNESS
Howard P. King

INVENTOR:
James L. Taylor,
BY Russell M. Everett,
ATTORNEY.

J. L. TAYLOR.
CLAMP MACHINE.
APPLICATION FILED APR. 7, 1916.

1,320,808.

Patented Nov. 4, 1919.
6 SHEETS—SHEET 5.

WITNESS

Howard P. King.

INVENTOR;
James L. Taylor,
BY Russell M. Everett,
ATTORNEY.

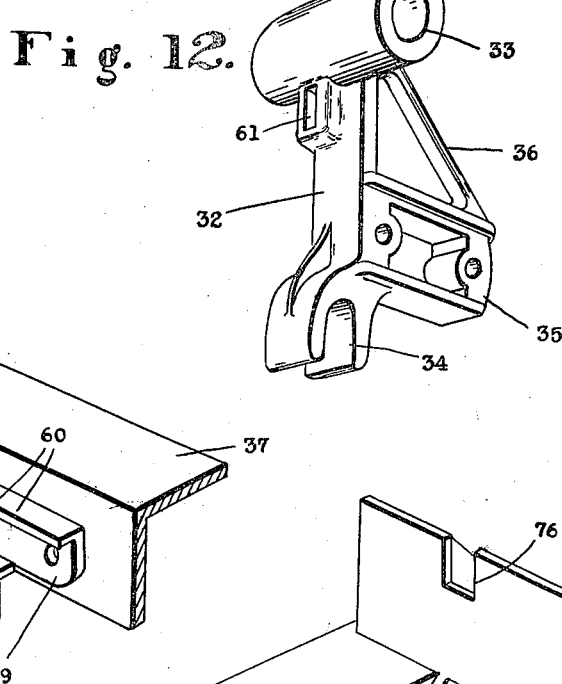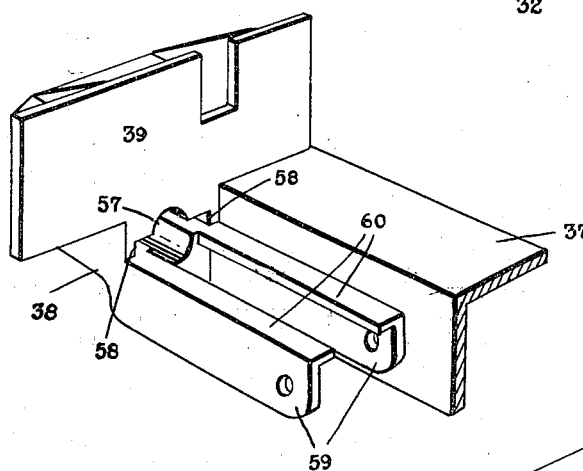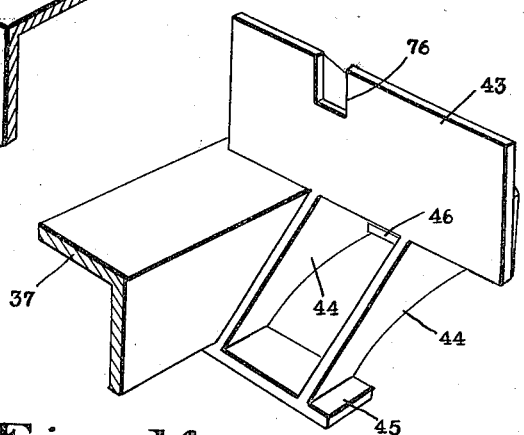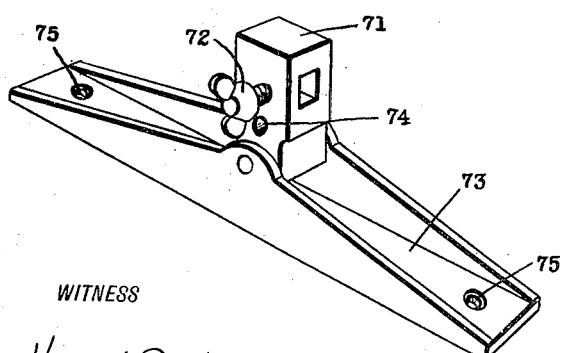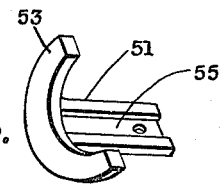

UNITED STATES PATENT OFFICE.

JAMES L. TAYLOR, OF POUGHKEEPSIE, NEW YORK, ASSIGNOR TO THE JAMES L. TAYLOR MANUFACTURING CO., OF NEW YORK, N. Y., A CORPORATION OF NEW YORK.

CLAMP-MACHINE.

1,320,808.      Specification of Letters Patent.      Patented Nov. 4, 1919.

Application filed April 7, 1916. Serial No. 89,541.

*To all whom it may concern:*

Be it known that I, JAMES L. TAYLOR, a citizen of the United States, and a resident of Poughkeepsie, in the county of Dutchess and State of New York, have invented certain Improvements in Clamp-Machines, of which the following is a specification.

This invention relates to that class of machines wherein a longitudinal series of clamps, either singly or in transverse series, are carried or travel past a given point at which workmen can insert into the clamps pieces of work to be clamped, the work thus inserted being immediately taken out of the workman's way by the operation of the machine and other clamps presented to receive other pieces of work, so that it is unnecessary to stand the filled clamps around for the glued work to set or dry and they are automatically taken care of by the machine until the work is all ready to be removed, to a great saving of space and labor.

The objects of the invention are to provide an improved machine of this character; to enable the workman to move the series of clamps by hand as he desires, and yet have the machine of large capacity for work; to secure compactness, by having the pieces of work arranged close together while traveling to set or dry; at the same time to provide ample room for access to the clamps when work is being removed or inserted; to provide improved means for attaching the clamps to their carrier; to have longitudinally adjacent clamps or series of clamps connected to the one and the same cross-rod of the carrier; to thus secure counteracting or balanced strains on the cross-rods of the carrier; to provide an improved carrier, and an improved supporting frame for the same and its clamps; to provide a powerful quick-acting clamp for use in such a machine; to attach the clamps to the carrier so that their points of attachment remain close to the driving sprockets when passing around the same; to provide improved stationary and movable jaws, and means for operating the same; to provide improved means for adjustably and removably holding forms of various shapes to fit against the side of the work, as in gluing school seats and backs or other curved work, and to obtain other advantages and results as may be brought out in the following description.

Referring to the accompanying drawings, in which like numerals of reference indicate the same parts throughout the several views, Figure 1 is a side elevation of my improved machine with a portion of its length broken away;

Fig. 2 is an end view of the same from the front or end at which the operator stands;

Fig. 12 is a perspective view of the spanner foot of the clamp;

Fig. 13 is a perspective view of the head of the clamp, showing the stationary or fixed jaw;

Fig. 14 is a perspective view of the movable jaw;

Fig. 15 is a perspective view of a form-carrying plate, and

Fig. 16 is a perspective view of a locking member for the clamping nut or handle.

Figure 1:
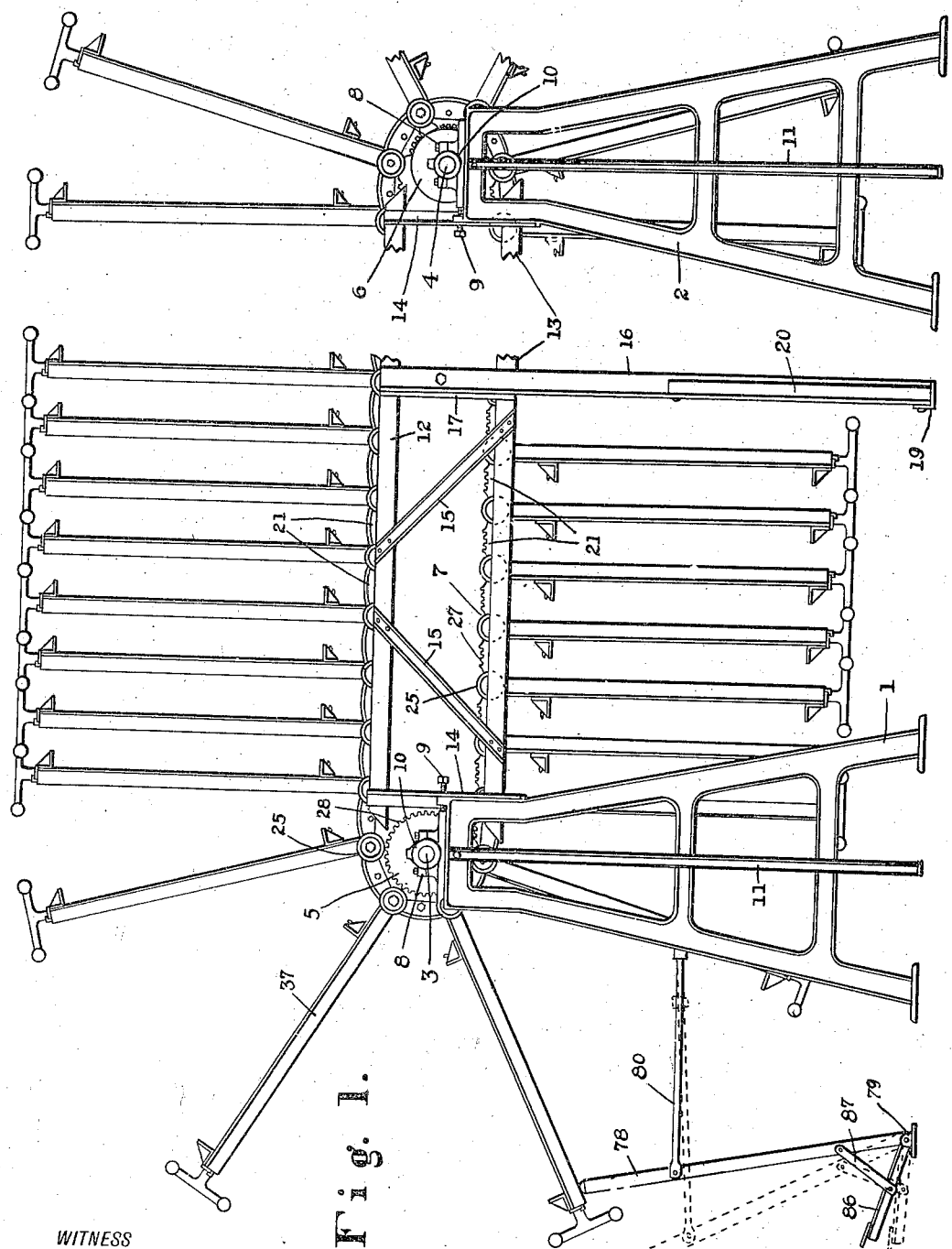

In said drawings 1, 1 and 2, 2 indicate front and rear pairs of standards, the standards of each pair being spaced in parallel relation and providing a clear space between themselves. The standards of each pair provide at their tops alined bearings for a shaft, and these front and rear shafts 3, 4 have fast upon themselves between the standards 1, 2 and adjacent thereto wheels or drums 5, 6 upon which are mounted endless carrier chains 7 made up of links and connected by cross-rods as will hereinafter be more fully described. Preferably the front wheels or drums 5 have teeth or cogs which mesh with similar teeth or cogs on the links and so positively drive the carrier chains after the manner of sprockets. Also, preferably the bearings for the shafts 3, 4 are provided by boxes 8 slidably mounted upon the tops of the standards 1, 2 and provided with screws 9 by which they can be forced apart to take up any slack in the carrier chains, as is common in the art. While I have shown such adjustable bearings for both the front and rear shafts, it will be understood that under some conditions it might be sufficient to provide them for only one of the shafts.

Upon the ends of the shafts 3, 4, outside their said bearings, are collars 10 each securely fixed against any movement longitudinally of the shaft and thus serving to steady the standards against displacement with respect to each other outwardly apart. Furthermore, braces 11 of any suitable construction such as light channel irons extend one from the top of each standard downwardly and outwardly to the floor, the feet of said braces as well as the bases of the standards being preferably bolted to the floor or otherwise suitably secured. By these or other suitable equivalent means the standards are held in substantially rigid and stable position for the purposes indicated.

Figure 4:
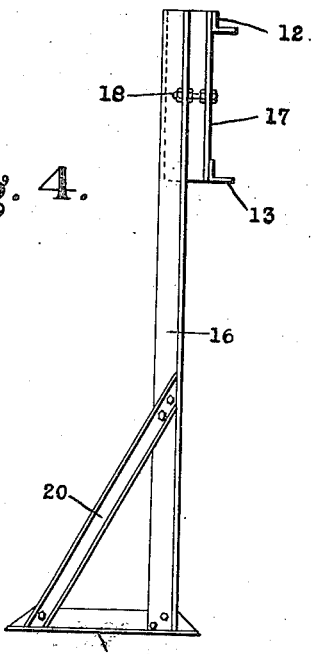
Fig. 4 shows in elevation, looking longitudinally of the machine, the certain intermediate bracing support, any number of which can be employed.
Figure 3:
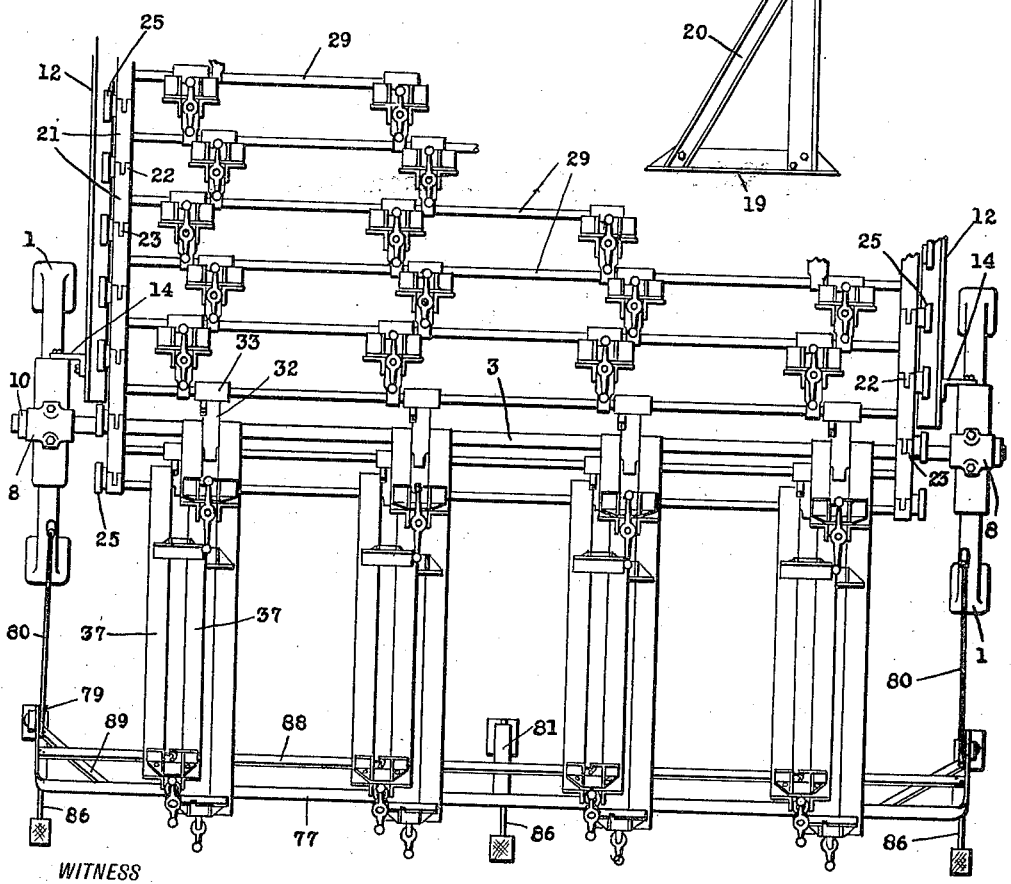
Fig. 3 is a plan of the front end portion of the machine.
Figure 5:
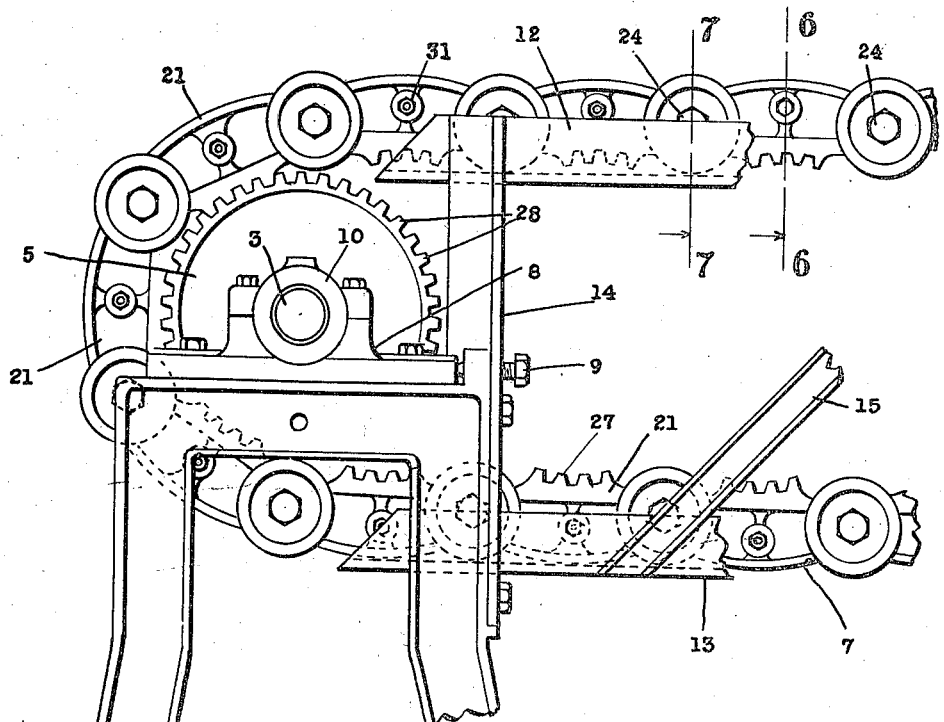
Fig. 5 is a side elevation of the front end of the machine with the clamps removed and some parts broken away for greater clearness.
Figures 6, 7:
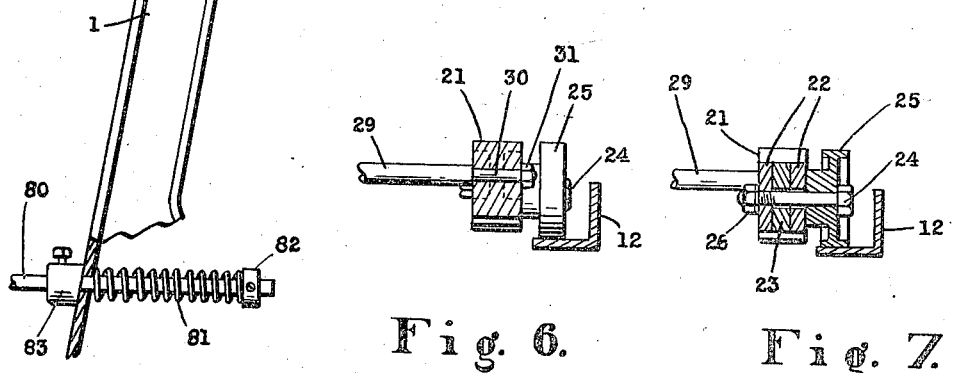
Fig. 6 is a detail section on line 6—6 Fig. 5.
Fig. 7 is a detail section on line 7—7 Fig 5.

At each side of the machine are upper and lower rails 12 and 13 each preferably formed of angle iron with one flange extending horizontally inward and the other flange extending upward, so as to form runs for the upper bights of the endless carrier chains, as shown in Figs. 5–7 most clearly. The upper and lower rails at each side of the machine extend substantially from front to rear wheels or drums 5, 6 and are connected near their ends by uprights 14 each formed of angle iron one flange of which is bolted flatwise upon the outside of the rails and the other flange bolted to the end edge of the adjacent standard which is next the other standard and which is in a plane transverse of the machine, as shown in Figs. 1–3 and 5. In other words, the front upright 14 is secured by bolts to the rear edge of the top of the front standard 1, while the rear upright is similarly bolted to the front edge of the rear standard 2, and obviously this locates or offsets the rails 12 and 13 as far inward from the standards as is desired. It may be here noted, that the rails 12, 13 not only form guides and rests for the chain, but also brace the two standards at the same side of the machine against the tendency of the carrier to draw them together. The upper and lower rails at one side of the machine may be braced in any suitable manner, as by the braces 15 which I have shown, and preferably they are supported intermediate the front and rear standards by legs 16 which I have shown as bolted to middle uprights 17 which are in turn bolted to the outer sides of the rails as those already described. Preferably the leg is formed of angle iron, and a bolt 18 is passed through the parallel flanges of the leg and upright 17 with nuts on opposite sides of both the flanges, so as to brace them, as clearly shown in Fig. 4. The leg 16 extends downward to the floor, and is provided with a suitable foot 19 from which a brace 20 may extend upward as shown or any other suitable construction be employed. Obviously any number of these legs or pairs of legs can be employed, as rendered necessary or desirable by the length of the machine and they may be of any detail construction desired.

The carrier chains 7 each comprise links 21 forked at one end, as 22, and having a tongue 23 at the other end to enter the forked end of the next links, a bolt 24 being passed through both the tongue and forked end to pivotally secure them together, see Figs. 5–7. A roller 25 is also mounted upon this bolt 24 at the outer side of the chain and travels upon the horizontal flanges of the guide rails 12, 13 to reduce the friction, the bolt being threaded into the opposite arm of the forked link end and receiving a nut 26 outside the same, so that both the roller and the link joint work freely. The inner edge of each link has a rack 27 formed thereon and adapted to engage the teeth 28 of the front or driving wheel 5 and thus cause the chains to move positively therewith and secure positive uniformity in their movement. Said rack is shown arcuate, but this is not essential.

From the middle of each link of one chain to the middle of an opposite link of the other chain extends a cross-rod 29 preferably having its ends reduced, as at 30, to enter the two opposite links and receive on the outer sides thereof nuts 31 or other retaining means. It is upon these rods of the successive links that the clamps are mounted in my improved machine, and it will be understood that thus they move around their path in definite position, the said rods always remaining parallel to the shafts 3, 4 and supported at their ends by the links traveling either upon the periphery of the front and rear wheels 5, 6 or upon the upper and lower guide rails 12, 13. It is not only desirable for the rods carrying the clamps to be supported from two pairs of links, but also to be secured to said links as close as possible to the points of tangency of the links to the driving wheels as they pass around said wheels. Obviously in passing around the wheels 5, 6 the links engage said wheels intermediate of the ends of themselves, so it is the middles of the links which are closest to the peripheries of the wheels, and as shown, the rods are positioned at the middles of the links so that passing around the wheels will not move the rods radially with respect to the wheels. The clamps, therefore, carried upon the rods of two pairs of links, are very steadily supported even while passing around the wheels, and will not rock up and down as they might if both rods supporting one clamp were carried by one pair of links.

Figure 11:
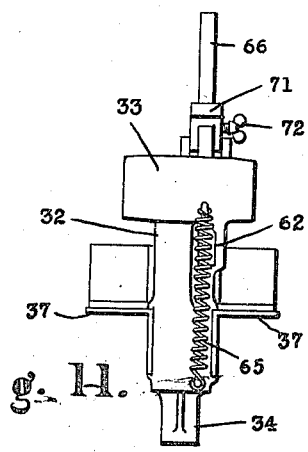
Fig. 11 is an elevation of the opposite or attached end of the clamp.

Each of the clamps comprises a spanner foot or base casting 32, see Fig. 12, which is disposed transversely of the clamp and adapted to extend longitudinally of the carrier, having at one end a transverse bearing 33 to receive one of the cross-rods 29 and its other end forked as at 34 to receive the next forward rod 29. The said bearing 33 is a long sleeve adapted to secure a firm bearing upon the rod 29, but the forward forked end 34 is narrower and serves simply to stay the clamp against movement transversely of the rods 29. Intermediate the ends of this spanner foot or base piece 32, and preferably nearer the forked end, an extension 35 projects inward or toward the inside of the endless carrier a sufficient distance for the purposes next to be described and preferably for the width of the body of the spanner foot, the outer end of said extension 35 being steadied by a brace 36 extending to the sleeve-like bearing, as shown. To the opposite sides of said extension 35 is bolted a pair of angle bars 37, 37, so that two of their flanges lie flatwise against said projection in parallel spaced relation to each other and the other flanges project outwardly apart at the edge of the extension next the sleeve-like bearing 33, and thus substantially midway between the two end bearings of the spanner foot, as shown in Fig. 11, forming a supporting surface to receive the work to be clamped. These angle bars project perpendicularly from the spanner foot, outwardly away from the carrier, to the length desired for the clamp and at their opposite ends are secured to a head 38 to the opposite sides of which they are bolted in the same parallel relation as at the foot or base piece 32.

This head 38 comprises a body against the opposite sides of which the parallel flanges of the angle bars 37, 37 lie, and above the other flanges the head provides a fixed jaw 39 adapted to engage the work and which extends transversely across the body portion and work-supporting flanges of the angle bars. The body portion of the head is apertured below the jaw and between the angle bars 37, 37 so that a screw 40 projects therethrough and is adapted to receive a handled clamping nut 41 at the front of the head, the rear end of the screw being attached to a connecting strip 42 which extends backward between the angle bars of the clamp and is secured at its rear end to an adjustable jaw 43 overlying the angle bars transversely thereof and adapted to engage the opposite edge of the work from the fixed jaw. This adjustable jaw 43 sits upon the top flanges of the angle bars 37 and has arms 44, 44 extending forwardly downward between and adjacent the parallel flanges of the angle bars and provided at their lower ends with ledges 45, 45 to hook therebeneath all as clearly shown in Figs. 8, 9 and 14. Adjacent the jaw proper and at the back of the same, the arms 44, 44 are connected by a cross-piece 46 which serves as a rest for the connecting strip 42, and directly above said rest is the free end of a latch 47 pivoted to the back of the jaw proper and which is normally forced downward by a spring 48 into any one of a longitudinal series of apertures 49 in said strip 42, so as to secure the jaw in fixed relation to said strip. The latch 47 can be released by its handle and set at various points along the length of the connecting strip, according to the width of the work to be clamped, and it will be understood that after it has been so located as near the width of the work as is convenient, the clamp is tightened against the work by means at the other end or head and next to be described.

Figure 8:
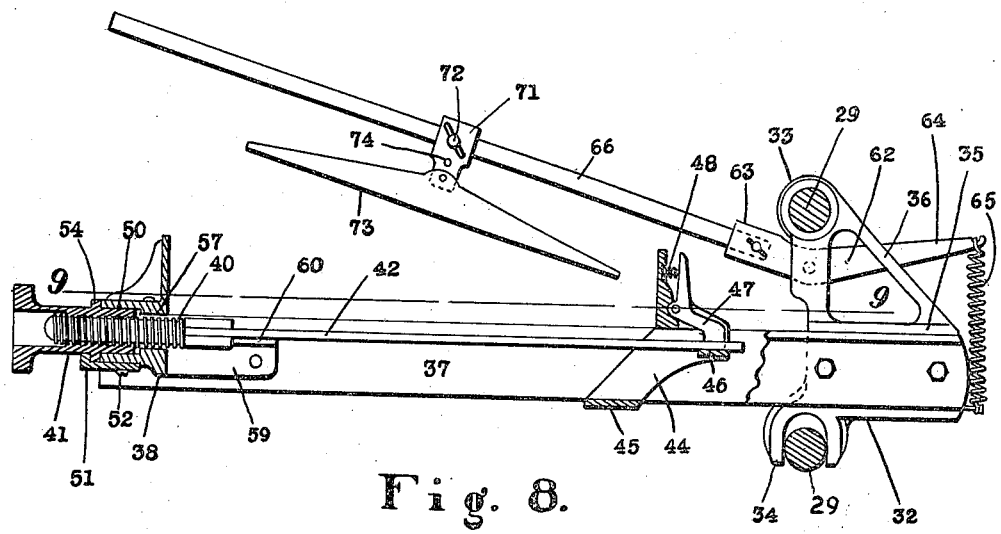
Fig. 8 is a side elevation of one of the clamps partly in central longitudinal section as on line 8—8 Fig. 9.
Figure 9:
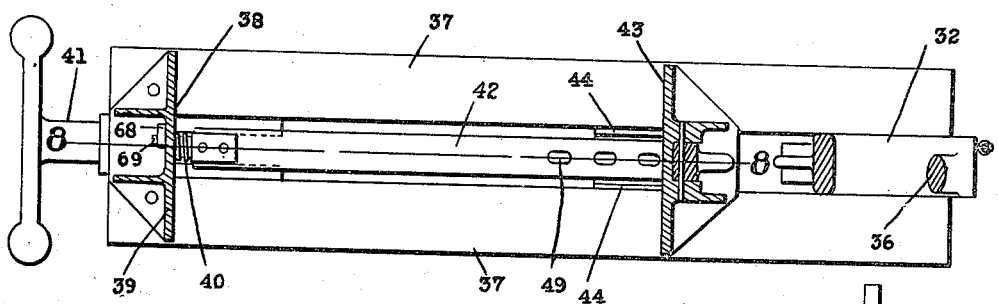
Fig. 9 is a section taken on line 9—9 Fig. 8 and showing the face of the clamp which is adapted to receive the work.
Figure 10:
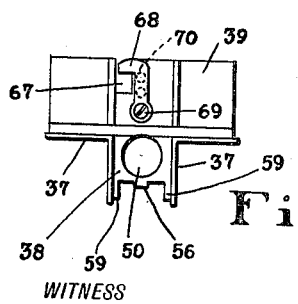
Fig. 10 is an elevation of the free or outer end of the clamp with the adjusting member and its retaining means removed.

The body portion of the head 38 is shown recessed at the front, as at 50, Fig. 8, to receive the inner end of the tubular or sleeve-like nut 41 provided at its outer end with a suitable handle for turning, and it will be understood that this clamping nut turns loose with respect to the head. To retain it in position with respect to the head a locking member 51, see Fig. 16, secured to the head as by a screw 52, provides an arcuate flange 53 which lies outside an annular flange 54 on the nut and adjacent the front of the head, as shown in Fig. 8. Preferably this locking member is grooved at its side next the head, as at 55, to fit over a rib 56 to prevent any lateral displacement. The head receives the screw 40 loosely, as at 57, and furthermore is longitudinally grooved at opposite sides of said aperture, as at 58, 58, to enable the connecting strip 42 to be inserted from the front of the head. Preferably wings 59, 59 project from the rear of the lower part of the head to lie against the inner facing sides of the parallel flanges of the angle bars 37, 37 and are riveted thereto, as shown in Figs. 8, 9 and 13 more especially and also said wings have at their upper edges flanges 60 lying beneath the connecting strip 42 and providing a slideway for the same, the upper faces of said flanges being flush with the bottoms of the grooves 58, 58 in the opposite side walls of the aperture 57 of the head, as clearly shown in Fig. 13.

It is sometimes necessary to apply on top of the work in the clamp a form to prevent the work from bulging outwardly and to hold it in shape, as for instance in gluing the backs and seats of school furniture and the like. And in providing means for this purpose I aperture the body of the spanner foot 32 or base casting of the clamp, as at 61, adjacent the sleeve-like bearing 33 and pivot therein a bent lever 62 having a socketed forward arm 63 and a rear arm 64 adapted to receive a tension spring 65 connected to the extension 35 of the spanner foot so as to normally throw the socketed arm 63 of the bent lever upward. In said socketed arm is removably inserted a rod 66 adapted to extend the entire length of the clamp and be detachably locked at its forward end to the head 38 when depressed into substantially parallel relation to the clamp against the power of the spring 65. Any suitable means may be employed for so locking the rod, but I have shown it as adapted to enter a notch or recess 67 in the top edge of the fixed jaw 39 and be secured by a latch 68 or other suitable means. Furthermore, I have shown the pivot 69 of this latch capable of being shifted into various holes 70 to vary the position in which the rod can be clamped and thus accommodate various kinds of work. Upon the rod 66 is a longitudinally adjustable block 71 adapted to be set wherever desired by a screw 72 and having a plate 73 pivoted to its end next the work-supporting surface of the clamp in any one of a series of holes 74, so as to secure further accommodation. This plate is provided with holes 75 for wood screws, and thus any kind of a form which may be readily shaped out of wood can be secured to the face of said plate 73 and brought against the work in the clamp, as will be understood by those skilled in the art. In case no shaping form is needed for the work being clamped, the rod 66 is removed from its socket and laid one side with its block 71 and plate 73. Obviously the adjustable jaw 43 must be notched or recessed at its upper edge, as at 76, see Fig. 14 more especially, in alinement with the notch or recess 67 in the upper edge of the fixed jaw 39, and it will be noted that these notches or recesses, as well as the aperture 61 in the spanner foot body, and the bent lever 62 pivoted therein, with its rod 66 are a little to one side of the central longitudinal line of the clamp for greater convenience and clearance.

As many clamps as desired may be arranged in a transverse row across the endless carrier of my improved machine; I have shown for illustration four, but one or any number could be used. Furthermore, the clamps are slidably adjustable longitudinally of the cross-rods 28 so as to accommodate them to pieces of work of various lengths.

It will be appreciated that in my machine each cross-rod 28 of the endless carrier serves to support both the forward ends of the clamps behind it and the rear ends of the clamps in front of it, and thus when making the turn at the front or rear end of the machine, so as to pass from upwardly projecting position to downwardly projecting position or vice versa, the strain upon any one cross-rod 28 by the forward ends of the spanner feet of one set of clamps is counteracted by the opposite strain of the rearward ends of the next set of clamps, both said strains being of course due to the overhang of the clamps with the work on them. For example, at the forward end of the machine, where the clamps are passing downward, the overhang of them cause the forward ends of their spanner feet to push inward or toward the wheels or drums over which the carrier runs, while the rear ends pull outward or in the opposite direction. At the opposite or rear end of the machine, where the clamps are passing upward, of course the forward ends of the spanner feet pull outward and the rear ends push inward, but in either case the strains upon any one cross-bar are opposite and balanced. It will therefore be understood that the feature of my invention by which the adjacent ends of two transverse series of clamps are attached to the same cross-rod is of great importance, for in this way a great deal of strain is taken off the machine and very advantageous results obtained. Furthermore, greater compactness is secured in that the transverse series of clamps can be arranged close together as shown in the drawing, and yet it will be noted that when they pass around the ends of the machine, and particularly the front end, they separate sufficiently to afford ample access for inserting and removing work.

In use of the machine the operator, standing at the front end of it, places the work in a transverse series of clamps occupying a downwardly inclined position as shown in Fig. 1, and preferably means are provided for supporting that series of clamps in such position. Any suitable means can be employed, but for illustration I have shown (in Figs. 1, 2 and 3) a piece of T-iron bent into inverted U-shape with its middle portion 77 extending horizontally beneath the transverse series of clamps near their outer ends and its end portions or legs 78, 78 extending downwardly and pivoted to feet 79 secured to the floor. Rods 80 hinged to the said legs intermediate of their upper and lower ends extend through slideways on the opposite standards 1, 1, said slideways preferably formed by holes in the flanges of said standards, and back of the standard springs 81 are placed on the ends of the rods 80 with stops 82 at the rear thereof, so that the support can be drawn forward enough to allow the transverse series of clamps to pass downward, as shown in dotted lines in Fig. 1. Stops 83 on said rods 80 at the front of the standards 1, 1 insure that the springs 81 will normally hold the support in proper operative position. For greater strength the U-shaped support is preferably provided with a middle leg 84 also hinged to a foot 85 secured to the floor, and for convenience each of the legs is preferably provided with a treadle by means of which the entire support can be swung forwardly outward to release the clamps. I have shown these treadles formed by arms 86 projecting from the hinge pins of the feet 79, 85 and connected to the legs by links 87, but any suitable construction could be used. The U-shaped support is braced in any suitable way, as by a cross-piece 88 and corner pieces 89, 89 see Fig. 2.

It will be understood that when one set of transverse clamps is filled with work, the U-shaped support is thrown outward to release it, and then the workman reaching upward grasps the ends of one or more clamps of the next transverse series and pulls them down into place to insert work, thus causing the entire carrier with all its clamps to move. This operation is continued until the transverse set of clamps first filled comes around again, or as long as desired.

Obviously detail modifications and changes may be made in manufacturing my improved clamp machine without departing from the spirit and scope of the invention, and I do not wish to be understood as restricting myself except as required by the following claims when construed in the light of the prior art.

Having thus described the invention, what I claim is.

1. The combination with a suitable support and an endless flexible carrier thereon having spaced cross-rods, of clamps each having a foot or base engaging at its opposite ends two cross-rods, two adjacent clamps longitudinally of the carrier having their adjacent ends engaging the same cross-rod, whereby under some conditions strains produced by said clamps upon their common cross-rod tend to balance each other.

2. In a machine of the character described, the combination with a suitable support and an endless carrier thereon comprising chains and cross-rods, of clamps each having a spanner foot transverse to its length and adapted to engage at its opposite ends two of said cross-rods, two adjacent clamps longitudinally of the carrier having their adjacent ends engaging the same cross-rod, whereby in other than vertical positions the said clamps produce strains upon the cross-rod which are opposite in direction and tend to balance each other.

3. The combination with a suitable support and an endless carrier thereon comprising chains of pivoted links and cross-rods extending one between each pair of opposite links, of clamps each having a foot or base transverse to its length and adapted to engage at its opposite ends two of said cross-rods, two adjacent clamps longitudinally of the carrier having their adjacent ends engaging the same cross-rod, whereby in other than vertical positions the said clamps produce strains upon the cross-rod which are opposite in direction and tend to balance each other.

4. The combination with a suitable support, an endless carrier thereon comprising chains of pivoted links with rollers on the pivot pins and cross-rods extending one between each pair of opposite links intermediate their ends, and tracks for said rollers, of clamps each having a foot or base transverse to its length and adapted to engage at its opposite ends two adjacent cross-rods, two adjacent clamps longitudinally of the carrier having their adjacent ends engaging the same cross-rod, whereby each clamp is supported by two pairs of links and by three pairs of rollers.

5. The combination with a suitable support, an endless carrier thereon comprising chains of pivoted links and cross-rods extending each between a pair of opposite links and driving wheels for said carrier adapted to engage its chains, of clamps each having a foot or base transverse to its length and adapted to engage at its opposite ends two adjacent cross-rods, two adjacent clamps longitudinally of the carrier having their adjacent ends engaging the same cross-rod and their opposite ends engaging cross-rods on opposite sides of said common cross-rod, whereby said two adjacent clamps are spaced longitudinally of the carrier and yet supported by two pairs of links.

6. The combination with a suitable support, an endless carrier thereon comprising chains of pivoted links, and driving wheels for said carrier adapted to engage its chains, of a series of clamps extending longitudinally of said conveyer each having a foot or base transverse to its length and supported from the middles of successive links, said clamps being staggered in said series and successive ones having their adjacent ends supported by the same links.

JAMES L. TAYLOR.

Copies of this patent may be obtained for five cents each, by addressing the "Commissioner of Patents, Washington, D. C."